(12) United States Patent
Miyake et al.

(10) Patent No.: US 9,210,292 B2
(45) Date of Patent: Dec. 8, 2015

(54) IMAGE PROCESSING APPARATUS AND METHOD USING DIFFERENT DITHER PATTERNS FOR DIFFERENT INKS AND SELECTING A QUANTIZATION PROCESS FOR EACH INK

(71) Applicant: CANON KABUSHIKI KAISHA, Tokyo (JP)

(72) Inventors: Nobutaka Miyake, Yokohama (JP); Junichi Nakagawa, Tokyo (JP); Akitoshi Yamada, Yokohama (JP); Tomokazu Ishikawa, Yokohama (JP); Shinjiro Hori, Yokohama (JP); Fumitaka Goto, Tokyo (JP); Ryosuke Iguchi, Kawasaki (JP); Hidetsugu Kagawa, Kawasakai (JP); Kouta Murasawa, Yokohama (JP); Hiromitsu Akiba, Yokohama (JP); Senichi Saito, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/495,736

(22) Filed: Sep. 24, 2014

(65) Prior Publication Data

US 2015/0092240 A1 Apr. 2, 2015

(30) Foreign Application Priority Data

Oct. 1, 2013 (JP) .................................. 2013-206319

(51) Int. Cl.
*G06K 15/00* (2006.01)
*H04N 1/40* (2006.01)

(52) U.S. Cl.
CPC ...................................... *H04N 1/40* (2013.01)

(58) Field of Classification Search
None
See application file for complete search history.

(56) References Cited

U.S. PATENT DOCUMENTS

| 5,521,990 | A |   | 5/1996  | Ishizawa              |
|-----------|---|---|---------|-----------------------|
| 5,636,331 | A | * | 6/1997  | Klinefelter et al. ............ 358/1.9 |
| 5,822,462 | A |   | 10/1998 | Miyake                |
| 5,864,638 | A |   | 1/1999  | Ishizawa              |
| 6,546,145 | B1|   | 4/2003  | Miyake                |

(Continued)

FOREIGN PATENT DOCUMENTS

| JP | 2006-50596 | 2/2006 |
| JP | 4574470    | 8/2010 |

OTHER PUBLICATIONS

U.S. Appl. No. 14/495,742, filed Sep. 24, 2014.
(Continued)

*Primary Examiner* — Steven Kau
(74) *Attorney, Agent, or Firm* — Fitzpatrick, Cella, Harper & Scinto

(57) ABSTRACT

Provided is a quantization processing method using dither patterns that make it possible to obtain a dot array having excellent dispersibility even in the case of a single color or mixed color inks. For this purpose, first and second dither patterns are prepared in order to respectively quantize multivalued data for a first ink to different pieces of binary data, respectively. Also, third and fourth dither patterns are prepared in order to respectively quantize multivalued data for a second ink to different pieces of binary data. Further, on the basis of a combination of the multivalued data on the first ink and the multivalued data on the second ink, a quantization unit for the first ink, and a quantization unit for the second ink are determined.

24 Claims, 11 Drawing Sheets

(56) References Cited

U.S. PATENT DOCUMENTS

| | | |
|---|---|---|
| 6,731,407 B1 * | 5/2004 | Hayama ............... 358/3.2 |
| 6,750,983 B1 | 6/2004 | Miyake |
| 6,804,419 B1 | 10/2004 | Miyake |
| 6,824,240 B2 | 11/2004 | Kusakabe |
| 6,954,542 B2 | 10/2005 | Miyake |
| 7,061,648 B2 * | 6/2006 | Nakajima et al. ............... 358/1.9 |
| 7,099,046 B2 | 8/2006 | Yamada |
| 7,116,448 B1 * | 10/2006 | Fujiwara ............... 358/3.2 |
| 7,312,901 B2 | 12/2007 | Yamada |
| 7,481,510 B2 * | 1/2009 | Hirano ............... 347/15 |
| 7,548,346 B2 | 6/2009 | Yamada |
| 7,672,011 B2 | 3/2010 | Kato |
| 7,855,809 B2 | 12/2010 | Kato |
| 7,859,723 B2 | 12/2010 | Yamada |
| 7,920,294 B2 | 4/2011 | Marumoto |
| 7,965,418 B2 | 6/2011 | Yamada |
| 8,368,961 B2 * | 2/2013 | Yamada ............... 358/3.13 |
| 8,503,031 B2 | 8/2013 | Kajihara |
| 8,619,319 B2 | 12/2013 | Tsuchiya |
| 8,830,530 B2 | 9/2014 | Sano |

OTHER PUBLICATIONS

U.S. Appl. No. 14/495,740, filed Sep. 24, 2014.

* cited by examiner

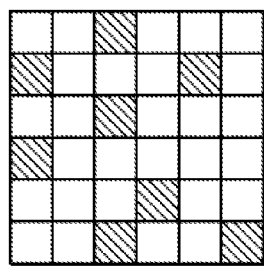
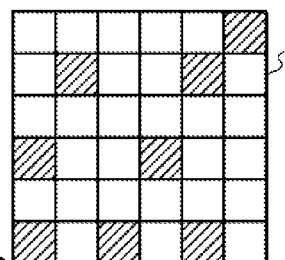
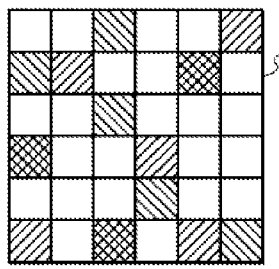
FIG.4A
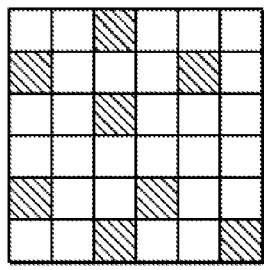
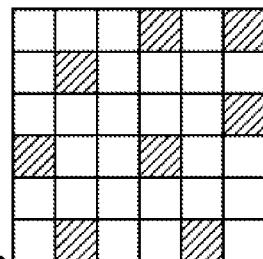
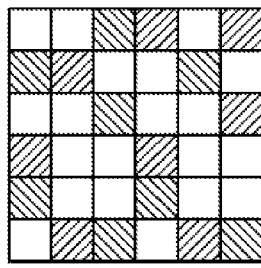
FIG.4B

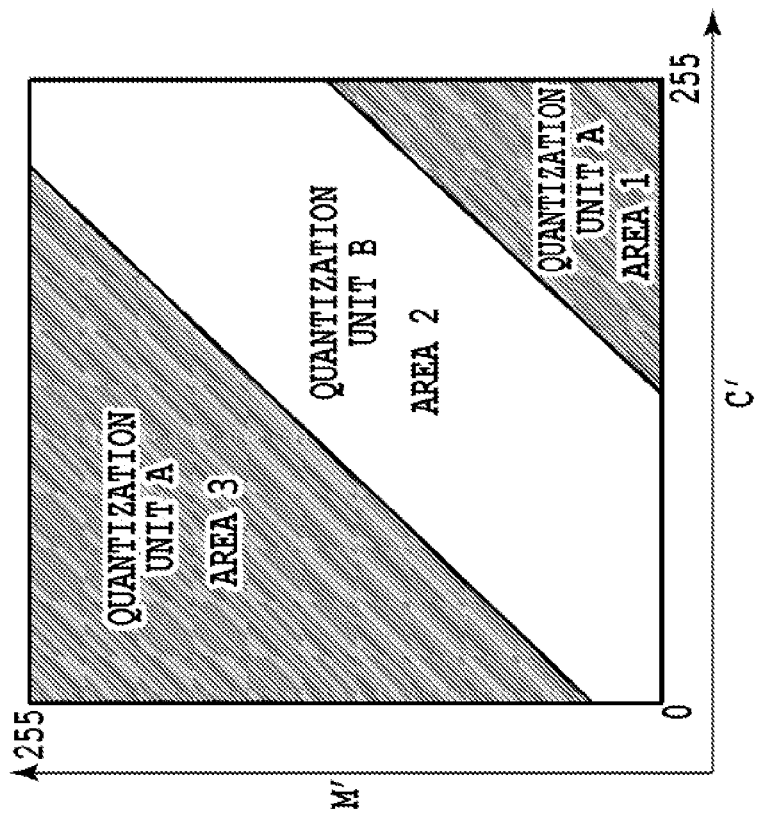
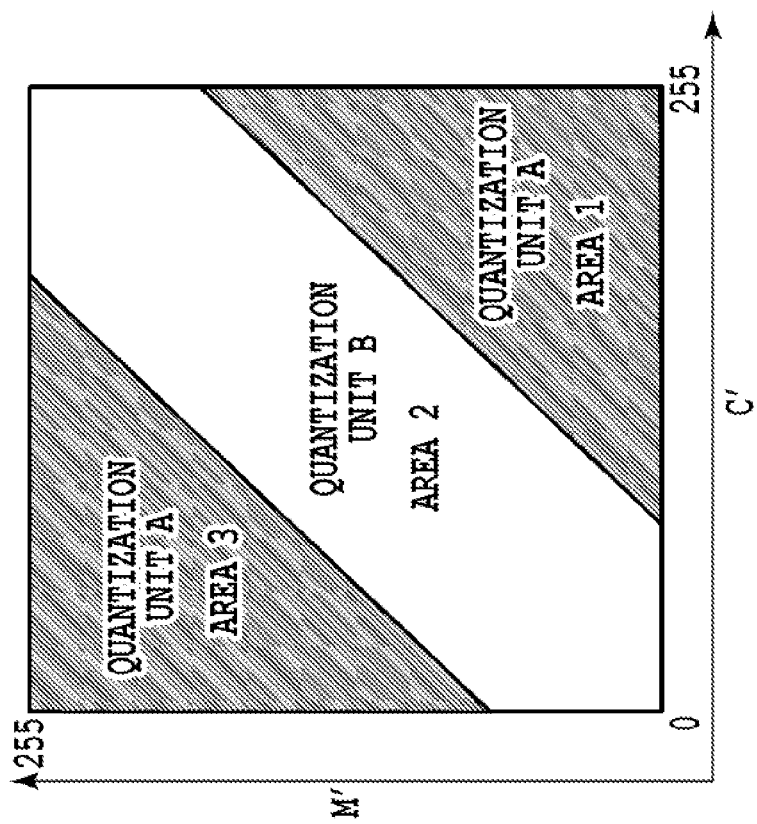

IMAGE PROCESSING APPARATUS AND METHOD USING DIFFERENT DITHER PATTERNS FOR DIFFERENT INKS AND SELECTING A QUANTIZATION PROCESS FOR EACH INK

BACKGROUND OF THE INVENTION

1. Field of the Invention

The present invention relates to a pseudo halftone process adapted to represent a multi-gradation image with two gradations. In particular, the present invention relates to a quantization process based on a prepared dither pattern.

2. Description of the Related Art

A pseudo halftone process adapted to represent a multi-gradation image with two gradations, i.e., printing (1) and non-printing (2) of a dot, requires a quantization process during converting multivalued density data to binary data. Typical quantization processing methods include an error diffusion method and a dither method, and in particular, the dither method is advantageously used for high-speed printers requiring speed and multicolor printers using a large data quantity in terms of being performable at high speed with less processing load.

A dot array on a print medium is determined by such a quantization process, and in particular, from a highlight part to a low-gradation part, high dispersibility is required in order to visually suppress graininess. Accordingly, in any of the error diffusion method and the dither method, various techniques adapted to increase dot dispersibility in a low-gradation part have been proposed. However, even in the case of employing the quantization process enabling high dispersibility, mutually superimposing multicolor dots on a sheet of paper like color image printing may deteriorate graininess. For example, in the case of employing the completely same quantization process for each of the colors, dots are printed at the same position for all of the colors, increasing graininess. On the other hand, in the case of performing a quantization process for each of the colors in an independent and uncorrelated manner, dispersibility is excellent for each of the colors, but as a result of superimposition, dot sparseness and denseness appear to negatively affect the dispersibility.

In consideration of such a problem, for example, Japanese Patent No. 4574470 discloses a dither pattern producing method that maximizes dispersibility obtained as a result of synthesizing a multiple color dot array. Using a dither pattern described in Japanese Patent No. 4574470 makes it possible to output image quality having high dispersibility and suppressed graininess even in a low-gradation part of a color image while avoiding beading (coagulation of dots).

However, in Japanese Patent No. 457440, a dither pattern for each color is set with a focus on the dispersibility obtained as a result of synthesizing the multiple color dot array, and therefore in the case of printing with a single color, dispersibility may be reduced as compared with a conventional dither pattern produced when only a single color is considered. That is, in the past, it has been difficult to achieve a dither pattern realizing high dispersibility both for a single color and for a mixed color.

SUMMARY OF THE INVENTION

The present invention is made in order to solve the above-described problem. Therefore, an object of the present invention is to provide a quantization processing method using a dither pattern that makes it possible to obtain a dot array having excellent dispersibility even for any single color and any mixed color.

In a first aspect of the present invention, there is provided an image processing apparatus that, in order to print an image on a print medium according to binary data defining printing or non-printing of a dot, processes pieces of multivalued data corresponding to multiple inks using dither patterns representing threshold values for comparing with values of the multivalued data, the image processing apparatus comprising: a first quantization unit configured to use a first dither pattern to quantize multivalued data for a first ink in such a way as to reduce the number of levels of the multivalued data for the first ink; a second quantization unit configured to use a second dither pattern that is different from the first dither pattern to quantize the multivalued data for the first ink in such a way as to reduce the number of levels of the multivalued data for the first ink; a third quantization unit configured to use a third dither pattern to quantize multivalued data for a second ink that has different color from the first ink in such a way as to reduce the number of levels of the multivalued data for the second ink; a fourth quantization unit configured to use a fourth dither pattern that is different from the third dither pattern to quantize the multivalued data for the second ink in such a way as to reduce the number of levels of the multivalued data for the second ink; and a selection unit configured to, on the basis of a combination of the multivalued data for the first ink and the multivalued data for the second data, select one of a quantization result from the first quantization unit and a quantization result from the second quantization unit to be used for printing of the first ink, and select one of a quantization result from the third quantization unit and a quantization result from the fourth quantization unit to be used for printing of the second ink.

In a second aspect of the present invention, there is provided an image processing apparatus that, in order to print a pseudo halftone image according to binary data defining printing or non-printing of a dot, converts pieces of multivalued gradation data corresponding to multiple inks to pieces of binary data corresponding to the respective inks, the image processing apparatus comprising: a first quantization unit configured to use a first dither pattern to quantize multivalued data for a first ink in such a way as to reduce the number of levels of the multivalued data of the first ink; a second quantization unit configured to use a second dither pattern to quantize the multivalued data for the first ink in such a way as to reduce the number of levels of the multivalued data for the first ink; a third quantization unit configured to use a third dither pattern to quantize multivalued data for a second ink in such a way as to reduce the number of levels of the multivalued data for the second ink; a fourth quantization unit configured to use a fourth dither pattern to quantize the multivalued data for the second ink in such a way as to reduce the number of levels of the multivalued data for the second ink; and a selection unit configured to, on the basis of output result of data quantized by the first quantization unit, output result of data quantized by the second quantization unit, output result of data quantized by the third quantization unit, and output result data quantized by the fourth quantization unit, select one of the first quantization unit and the second quantization unit for the first ink, and select one of the third quantization unit and the fourth quantization unit for the second ink.

In a third aspect of the present invention, there is provided an image processing method that, in order to print an image on a print medium according to binary data defining printing or non-printing of a dot, processes pieces of multivalued data corresponding to multiple inks using dither patterns representing threshold values for comparing with values of the multivalued data, the image processing method comprising: a first quantization step of using a first dither pattern to quantize multivalued data for a first ink in such a way as to reduce the number of levels of the multivalued data for the first ink; a second quantization step of using a second dither pattern that is different from the first dither pattern to quantize the multivalued data for the first ink in such a way as to reduce the number of levels of the multivalued data for the first ink; a third quantization step of using a third dither pattern to quantize multivalued data for a second ink that has different color from the first ink in such a way as to reduce the number of levels of the multivalued data for the second ink; a fourth quantization step of using a fourth dither pattern that is different from the third dither pattern to quantize the multivalued data for the second ink in such a way as to reduce the number of levels of the multivalued data for the second ink; and a selection step of, on the basis of a combination of the multivalued data for the first ink and the multivalued data for the second data, selecting one of a quantization result from the first quantization step and a quantization result from the second quantization step for printing of the first ink, and selecting one of a quantization result from the third quantization step and a quantization result from the fourth quantization step for printing of the second ink.

In a fourth aspect of the present invention, there is provided an image processing method that, in order to print a pseudo halftone image according to binary data defining printing or non-printing of a dot, converts pieces of multivalued data corresponding to multiple inks to pieces of binary data corresponding to the respective inks, the image processing method comprising: a first quantization step of using a first dither pattern to quantize multivalued data for a first ink to binary data; a second quantization step of using a second dither pattern to quantize the multivalued data for the first ink to binary data; a third quantization step of using a third dither pattern to quantize multivalued data for a second ink to binary data; a fourth quantization step of using a fourth dither pattern to quantize the multivalued data for the second ink to binary data; and a selection step of, on the basis of the binary data by the first quantization step, the binary data by the second quantization step, the binary data by the third quantization step, and the binary data by the fourth quantization step, selecting one of the first quantization step and the second quantization step for the first ink, and selecting one of the third quantization step and the fourth quantization step for the second ink.

In a fifth aspect of the present invention, there is provided an image processing apparatus that, in order to print an image on a print medium according to binary data defining printing or non-printing of a dot, uses dither patterns representing arrangement of a plurality of threshold values for comparing with multivalued data to process pieces of the multivalued data corresponding to multiple inks, the image processing apparatus comprising: a plurality of quantization units configured to quantize the multivalued data for a first ink in such a way as to reduce the number of levels of the multivalued data of the first ink, wherein arrangements of the threshold values used by the plurality of quantization units respectively are different from each other; a plurality of quantization units configured to quantize the multivalued data for a second ink in such a way as to reduce the number of levels of the multivalued data of the second ink, wherein arrangements of the threshold values used by the plurality of quantization units respectively are different from each other; and a determination unit configured to, on the basis of a combination of the multivalued data for the first ink and the multivalued data for the second ink, determine which quantization unit is to be used for printing of the first ink from the plurality quantization units for the multivalued data for the first ink, and determine which quantization unit is to be used for printing of the second ink from the plurality quantization units for the multivalued data for the second ink.

Further features of the present invention will become apparent from the following description of exemplary embodiments with reference to the attached drawings.

BRIEF DESCRIPTION OF THE DRAWINGS

FIGS. 4A and 4B are schematic diagrams for explaining dither patterns and results of quantization;

FIGS. 7A and 7B are diagrams illustrating tables referred to by a dot distribution estimating unit in the second embodiment;

DESCRIPTION OF THE EMBODIMENTS

Embodiments of the present invention will hereinafter be described in detail with reference to the drawings.

First Embodiment

Figure 1:
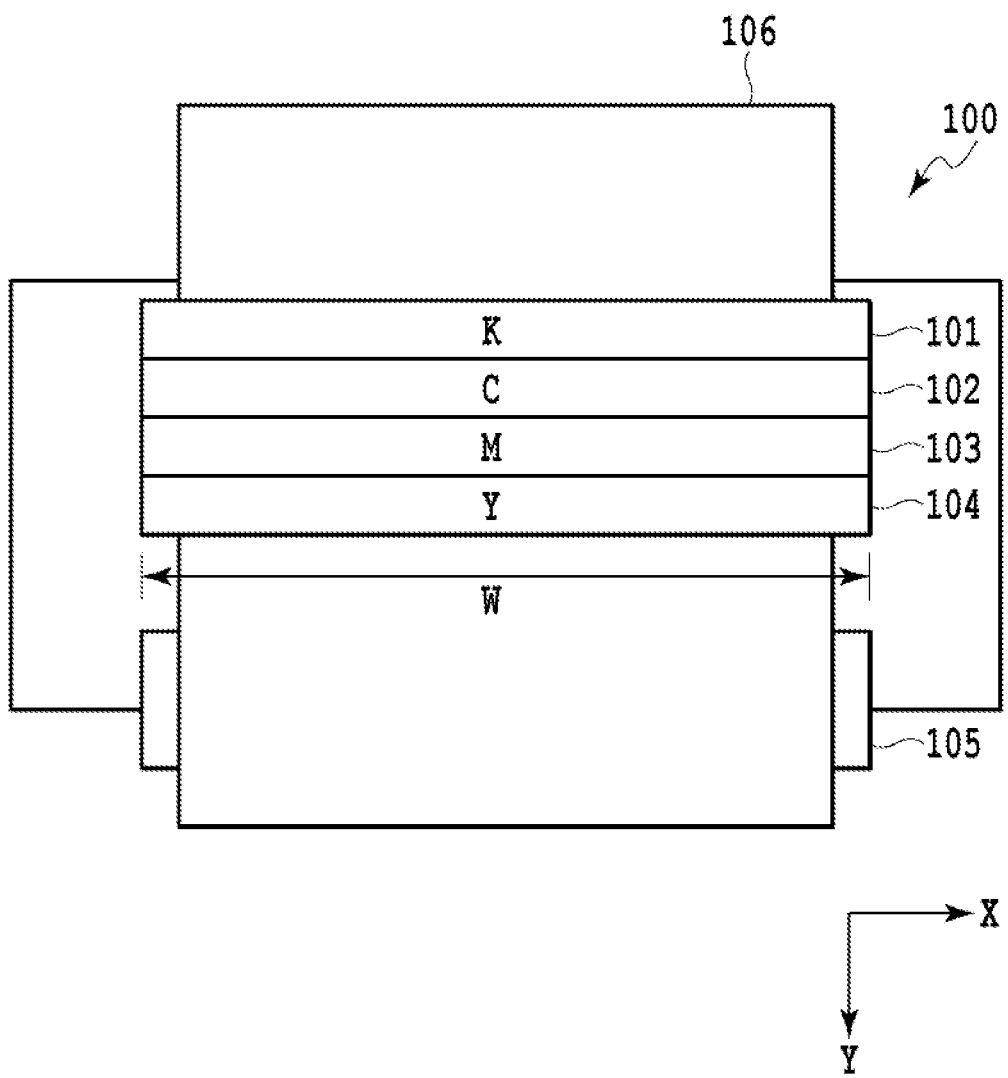
FIG. 1 is a top view of a full-line type inkjet printing apparatus applicable to the present embodiment.

FIG. 1 is a top view of a printing unit of a full-line type inkjet printing apparatus (image forming apparatus) applicable to the present embodiment. In the inkjet printing apparatus 100, print heads 101 to 104 are fixedly equipped on a frame as illustrated in the view. In each of the print heads 101 to 104, multiple printing elements ejecting a corresponding single color of black (K), cyan (C), magenta (M), and yellow (Y) inks are arrayed at regular pitches in an X direction in the view correspondingly to the width W of a print medium 106. The print medium 106 is conveyed at a constant rate in a Y direction as a conveyance roller 105 is rotated by an unillustrated motor as a driving source. In the course of the conveyance, each of the printing elements ejects a corresponding color of the inks according to print data to thereby print a predetermined image on the print medium 106.

Figure 2:
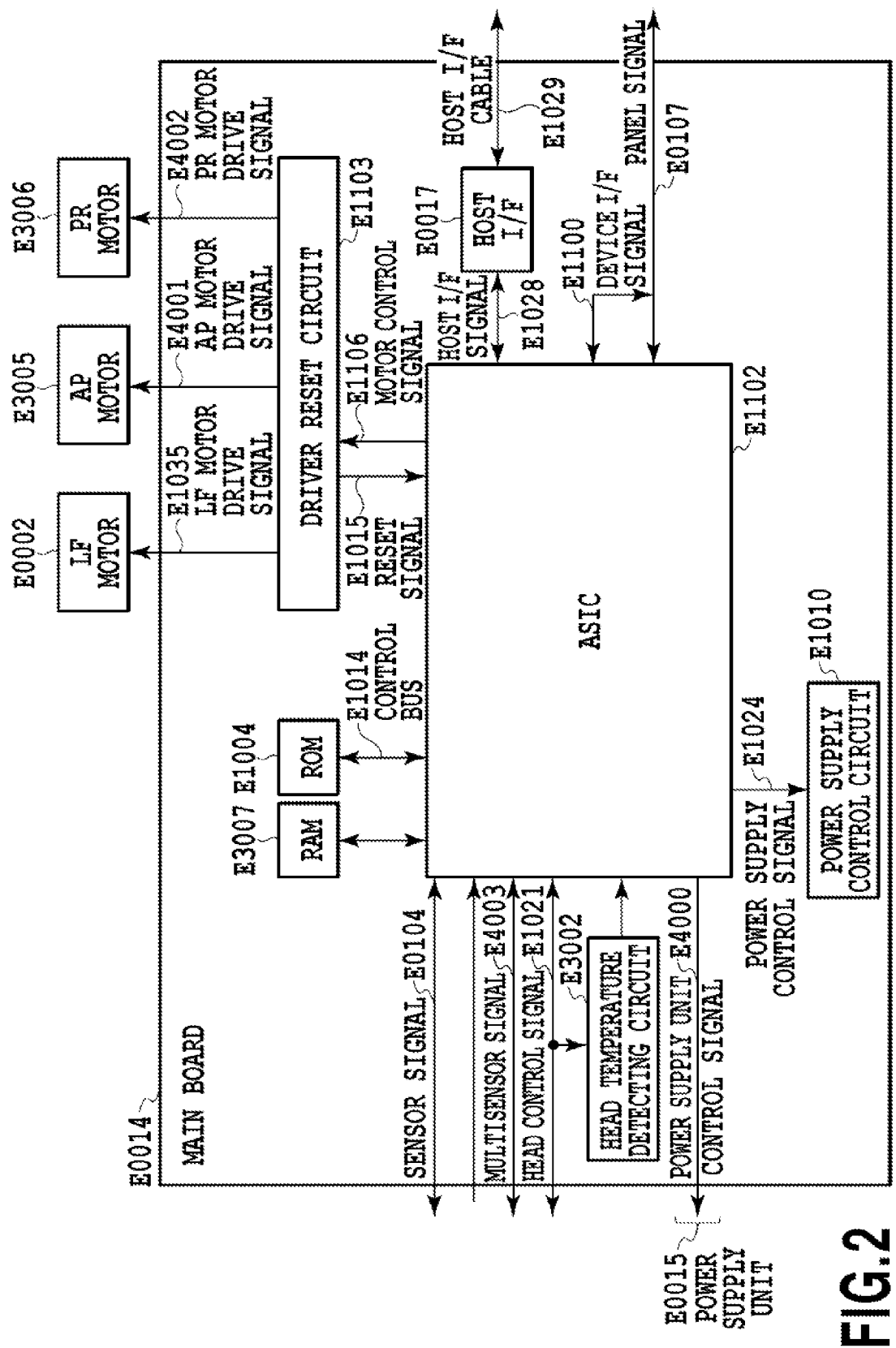
FIG. 2 is a block diagram illustrating an internal configuration of a printer engine.

FIG. 2 is a block diagram illustrating an internal configuration of a printer engine according to the present embodiment. On a main board E0014, an ASIC E1102 serving as an engine part of the image forming apparatus is provided, and the ASIC E1102 reads a program stored in an ROM E1004 through a control bus E1014, and according to the program, controls the whole of the apparatus. At this time, a DRAM E3007 is used as buffers such as a print data buffer and a reception data buffer for the ASIC E1102 or a host I/F signal E1028, or used as a work area necessary for various types of control operations, as well.

For example, the ASIC E1102 transceiver a sensor signal E0104 with any of various types of sensors, or a multisensor signal E4003 with a multisensor. The ASIC E1102 detects a panel signal E0107 that is an output from a power key, a resume key, or the like provided on an exterior panel of the apparatus. Further, the ASIC E1102 performs various types of logical operations, conditional judgments and the like, controls respective components, and performs drive control of the inkjet printing apparatus according to a data input state from the host I/F E0017.

A driver reset circuit E1103 drives various types of motors according to a motor control signal E1106 from the engine part ASIC E1102. Specifically, the driver reset circuit E1103 generates an LF motor drive signal E1035 to drive an LF motor E0002 adapted to rotate the conveyance roller 105. Also, the driver reset circuit E1103 generates an AP motor drive signal E4001 to drive an AP motor E3005 adapted to perform suction recovery of the print heads. Further, the driver reset circuit E1103 generates a PR motor drive signal E4002 to drive a PR motor E3006. The driver reset circuit E1103 of the present embodiment has a power supply circuit, and supplies necessary power to the main board E0014, a front panel installed on the exterior of the apparatus, and the like. Further, the driver reset circuit E1103 detects a reduction in power supply voltage to generate and initialize a reset signal E1015.

A power supply control circuit E1010 controls the supply of power to each sensor having a light emitting element or the like according to a power supply control signal E1024 from the ASIC E1102.

The host I/F E0017 transmits the host I/F signal E1028 from the ASIC E1102 to a host I/F cable E1029 connected to the outside, and also transmits a signal from the cable E1029 to the ASIC E1102.

Required electric power is supplied from a power supply unit E0015, and the supplied electric power is subjected to voltage conversion as necessary and then supplied to respective parts inside and outside of the main board E0014. The ASIC E1102 is connected to the power supply unit E0015 through a power supply unit control signal E4000, and controls a low power consumption mode or the like of the printing apparatus main body.

When performing a print operation, the ASIC E1102 generates a timing signal, and interfaces with the print heads through a head control signal E1021 to control ejecting operations. The head control signal E1021 is supplied to the print heads 101 to 104 via an unillustrated head drive voltage modulation circuit and head connectors. On the other hand, various pieces of information from the print heads 101 to 104 are also transmitted to the ASIC E1102. Of the various pieces of information, pieces of temperature information on the print heads 101 to 104 are subjected to signal amplification by a print head temperature detection circuit E3002 on the main board E0014, and then the amplified signals are inputted to the ASIC E1102 and used for various types of control determination.

Figure 3:
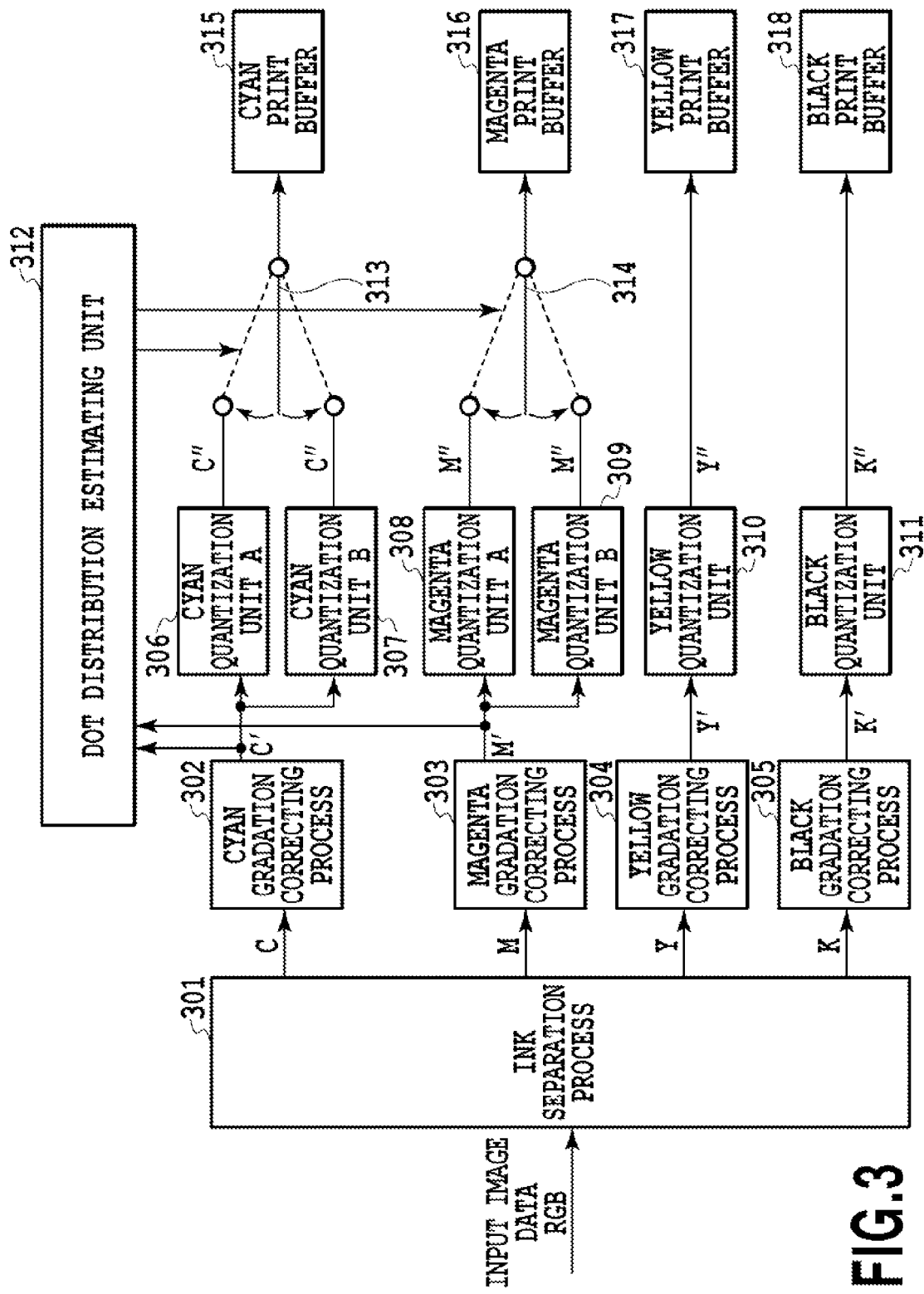
FIG. 3 is a main part block diagram for explaining image processing in the first embodiment.

FIG. 3 is a main part block diagram for explaining image processing performed by the ASIC E1102 in the present embodiment. Pieces of input image data received through the host I/F cable E1029 are pieces of multivalued (8 bits, 256 gradations) RGB data, and converted by an ink separation process 301 to pieces of multivalued (8 bits, 256 gradations) image data CMYK respectively corresponding to the inks used in the printing apparatus.

Gradation correcting processes 302, 303, 304, and 305 respectively prepared for cyan, magenta, yellow, and black convert the pieces of multivalued (8 bits, 256 gradations) gradation data CMYK to pieces of similar multivalued (8 bits, 256 gradations) gradation data C'M'Y'K'. In general, the relationship between the number of dots to be printed on a print medium and optical density realized on the print medium by the dots of the number is not linear. Accordingly, the gradation correcting processes 302 to 305 linearly convert the pieces of multivalued color signal data CMYK in order to make the relationship linear, and thereby the number of dots to be printed on the print medium is adjusted. Specifically, by referring to one-dimensional look-up tables prepared for the respective ink colors, CMYK are converted to C'M'Y'K'.

The pieces of image data C'M'Y'K' after the gradation correction are subjected to quantization processes respectively corresponding thereto by quantization processing units 306 to 311, and pieces of binary image data C"M"Y"K" are generated. In the present embodiment, for the quantization processes, a dither method is employed, and a dither pattern in which a pixel-based threshold value is predetermined is retained in each of the quantization processing units 306 to 311. Pieces of image data C'M'Y'K' on each pixel are compared with corresponding threshold values in the dither patterns, and converted to print "1" or non-print "0". The quantization processing units 306 to 311 retain the respectively different dither patterns; however, in the present embodiment, only for each of cyan and magenta, two types of quantization units A and B are prepared.

On the basis of a combination of the cyan data C' and magenta data M' after the gradation correcting processes, a dot distribution estimating unit 312 determines the performance of printing on the basis of any one of a set of output results of quantization units A and a set of output results of quantization units B. Switches 313 and 314 are connected to any one of a set of the quantization units A and a set of the quantization unit B on the basis of the determination by the dot distribution evaluating unit. The pieces of binary data C"M"Y"K" after the quantization are temporarily stored in print buffers 315 to 318 for the respective colors, and then printed by corresponding ones of the print heads 101 to 104.

FIGS. 4A and 4B are schematic diagrams for explaining dither patterns used in the quantization units A and the quantization units B, and quantization results. For simplicity here, a dither pattern having an area of 6 pixels×6 pixels is illustrated as an example. Referring to FIG. 4A, in the case where the quantization units A are selected, the cyan data C' is quantized according to a dither pattern 411 (first dither pattern), and the magenta data M' is quantized according to a dither pattern 412 (third dither pattern). In any of the patterns, each square represents one pixel, and a numeral in the square represents a threshold value assigned to the pixel. Also, in the case where a value of multivalued data C' or M' corresponding to each pixel is larger than or equal to a threshold value corresponding to the pixel, a quantized value C" or M" of the pixel is "1" (dot printing), whereas if the value of the multivalued data C' or M' is smaller than the threshold value, the quantized value C" or M" is "0" (dot non-printing).

The diagram illustrates an example where multivalued data "8" is uniformly inputted to all the pixels. In both of a cyan quantization result 413 and a magenta quantization result 414, only pixels respectively having threshold values smaller than or equal to "8" in the dither patterns 411 and 412 are indicated as print pixels by diagonal lines. In this case, by mutually superimposing the cyan quantization result 413 and the magenta quantization result 414 on the paper, a synthesized pattern 415 is obtained. In the synthesized pattern 415, a pixel indicated by diagonal lines represents a pixel printed with any one of cyan and magenta dots, and a pixel indicated by a check represents a pixel doubly printed with both of the cyan and magenta dots.

In the present embodiment, the dither patterns 411 and 412 respectively used in the quantization units A are patterns created with a focus on dot dispersibility in a single color printing case. Accordingly, dispersibility of each of the cyan quantization result 413 and the magenta quantization result 414 is high, but in the synthesized pattern 415 obtained by the superimposition of them, dispersibility is not considered, and therefore reduced as compared with the single color case to cause superimposed pixels in places. In such superimposed pixels, blue dots obtained by mixing cyan and magenta are formed; however, the blue dots are significantly different in lightness from blank pixels, thus causing deterioration in graininess.

Here, the dispersibility of dots is a barometer for evaluating a dot arrangement condition of a quantization image in a unit area of a uniform density. In a case of binarization, the gradation can be represented by dot area and the number of dots. However, a visual quality of the image may change according to sparseness and denseness of dots. For an image where dots arrange at high dispersibility, distances between dots don't vary widely and when a frequency conversion is performed outputs of low frequency component are small compared with an image where dots arrange at low dispersibility.

On the other hand, FIG. 4B illustrates dither patterns and quantization results in the case where the quantization units B are selected. In the case where the quantization units B are selected, the cyan data C' is quantized according to a dither pattern 421 (second dither pattern) to obtain a cyan quantization result 423. Also, the magenta data M' is quantized according to a dither pattern 422 (fourth dither pattern) to obtain a magenta quantization result 424. In this case again, multivalued data "8" is uniformly inputted to all the pixels, and only pixels respectively having threshold values smaller than or equal to "8" in the dither patterns 421 and 422 are indicated by diagonal lines as print pixels. Also by mutually superimposing the cyan quantization result 423 and the magenta quantization result 424, a CM dot arrangement pattern 425 is obtained.

In the present embodiment, the dither patterns 421 and 422 respectively used in the quantization units B are created with a focus on dot dispersibility in the case of synthesizing cyan and magenta to perform printing. Accordingly, the dispersibility of each of the cyan quantization result 423 and the magenta quantization result 424 is poorer than that of a corresponding one of the cyan quantization result 413 and the magenta quantization result 414 by the quantization units A. However, the synthesized pattern 425 obtained by the superimposition of them has an arrangement considering dispersibility, and therefore has high dispersibility as compared with the synthesized pattern 415 based on the quantization units A, thus causing no superimposed pixel.

As described, in the present embodiment, in the quantization units A, the dither patterns 411 and 412 that respectively consider dispersibility for cyan and magenta and have no mutual correlation are prepared to provide the quantization processes that are superior in single color dispersibility. On the other hand, in the quantization units B, as disclosed in Patent Literature 1, the dither patterns 421 and 422 that consider dispersibility for the synthesis of cyan and magenta and have mutual correlation are prepared to provide the quantization processes that are superior in dispersibility in a mixed color of cyan and magenta.

In FIGS. 4A and 4B, the dither patterns each having 6 pixels×6 pixels are taken as an example to provide the description for descriptive simplicity; however, in practice, larger-sized dither patterns are used. In the case of increasing the size of a dither pattern, a dot array period also increases to increase the degree of freedom of dot arrangement. Further, in order to focus on dispersibility as in the present embodiment, it can be said that dither patterns created so as to have blue noise characteristics with a size of 256 pixels×256 pixels, 512 pixels×512 pixels, or more are practical. Such dither patterns having the blue noise characteristics can realize dispersibility equivalent to that in the case of quantization by an error diffusion method. In the present embodiment, dither patterns created respectively for cyan and magenta so as to have the blue noise characteristics can be set as the dither patterns 411 and 412 used in the quantization units A. On the other hand, dither patterns created for a synthesis of cyan and magenta so as to have the blue noise characteristics can be set as the dither patterns 421 and 422 used in the quantization units B.

Figure 5:
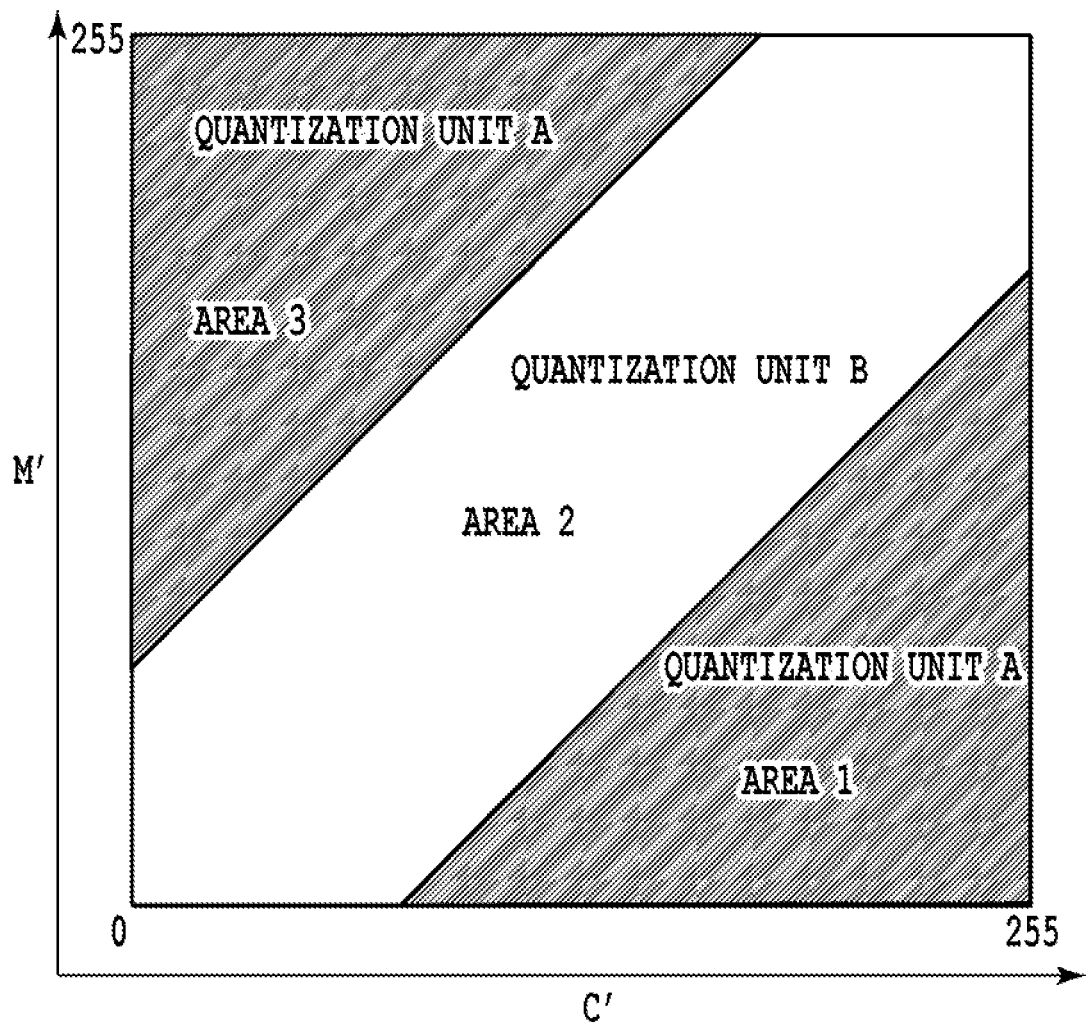
FIG. 5 is a diagram illustrating a table referred to by a dot distribution estimating unit in the first embodiment.

FIG. 5 is a diagram illustrating a table referred to by the dot distribution estimating unit 312 illustrated in FIG. 3 in order to determine the quantization units A or the quantization units B. The horizontal axis represents an output signal C' (0 to 255) from the cyan gradation correcting process 302, and the vertical axis represents an output signal M' (0 to 255) from the magenta gradation correcting process 303. On the C'-M' plane, the areas 1 and 3 represent areas where the quantization units A are selected, whereas the area 2 represents an area where the quantization units B are selected.

The area 1 is an area where a signal value of C' is higher than that of M', and therefore to obtain high dispersibility, focusing on the dispersibility of a single color of cyan is effective. For this reason, the quantization unit A which is superior in single color dispersibility are selected. On the other hand, the area 2 is an area where ratios of C' and M' are nearly equal, and therefore to obtain high dispersibility, focusing on the dispersibility of the mixed color of cyan and magenta is effective. For this reason, the quantization units B which are superior in dispersibility of the mixed color of cyan and magenta are selected. Further, the area 3 is an area where a signal value of M' is higher than that of C', and therefore to obtain high dispersibility, focusing on the dispersibility of a single color of magenta is effective. For this reason, the quantization units A which are superior in single color dispersibility are selected.

As described, in the present embodiment, depending on the combination of cyan and magenta gradation values C' and M', dither patterns respectively used for the quantization processes are changed. In doing so, dither patterns making it possible to obtain high dispersibility for the mixed color, and dither patterns making it possible to obtain high dispersibility for the single colors can be appropriately switched with each other depending on the degree of color mixture, and therefore even in the case where the degree of color mixture is changed, a pseudo halftone image superior in dispersibility can be stably outputted.

Note that it is not necessary to select a set of quantization units or switch the switches 313 and 314 on a pixel basis. Switching timing (period) is not particularly limited, but preferably corresponds to the size of the dither pattern or larger. For example, in the case of dither patterns each including N pixels×M pixels, average values $C_{ave}$ and $M_{ave}$ in the N pixels×M pixels areas for C' and M' may be calculated to switch between the sets of quantization units with $C_{ave}$ and $M_{ave}$ being applied to the horizontal and vertical axes of the table illustrated in FIG. 5. Alternatively, the present invention may be configured to obtain average values ($C_{ave}$ and $M_{ave}$) or values of highest number among all pixels within a page, and set a fixed set of quantization units within one and the same page.

Further, in FIG. 5, the entire C'-M' area is linearly divided into the three areas; however, the entire C'-M' area may be non-linearly divided, or the entire C'-M' area may be divided into many more areas to make dither patterns having different characteristics correspond to the areas. In particular, in the quantization units A or quantization units B, the dither patterns focusing on dot dispersibility are prepared; however, in an actual printing apparatus, in the case of middle or higher density, graininess is not so much a concern in many cases. Accordingly, for areas having middle or higher density, it is preferable to prepare dither patterns that have characteristics suitable to middle or higher density and different from the dither patterns in FIGS. 4A and 4B.

Further, the present embodiment is configured to prepare the table as illustrated in FIG. 5 to determine a set of quantization units; however, the present invention may be configured to prepare a function of C' and M' as variables, and determine a set of quantization units on the basis of a calculation result of the function.

This embodiment is explained such that a binary data of printing "1" or non-printing "0" is generated; however, the present invention can be adapted to a case where three or more valued data is generated. That is, the quantized processing may be a process of downing value of gradation for reducing the number of levels of gradation. For example, when 8-bit signals (256-valued) data for each color are inputted, the quantization processes unit may quantize the data to 8-valued data. Then, for the quantized 8-levels signals, it is effective for gradation expression to arrange dots based on a pattern prepared for the signals or to change dot size according to the signals. The quantization processing into three or more valued data can be adapted to embodiments including the second embodiment explained follow.

Second Embodiment

Figure 6:
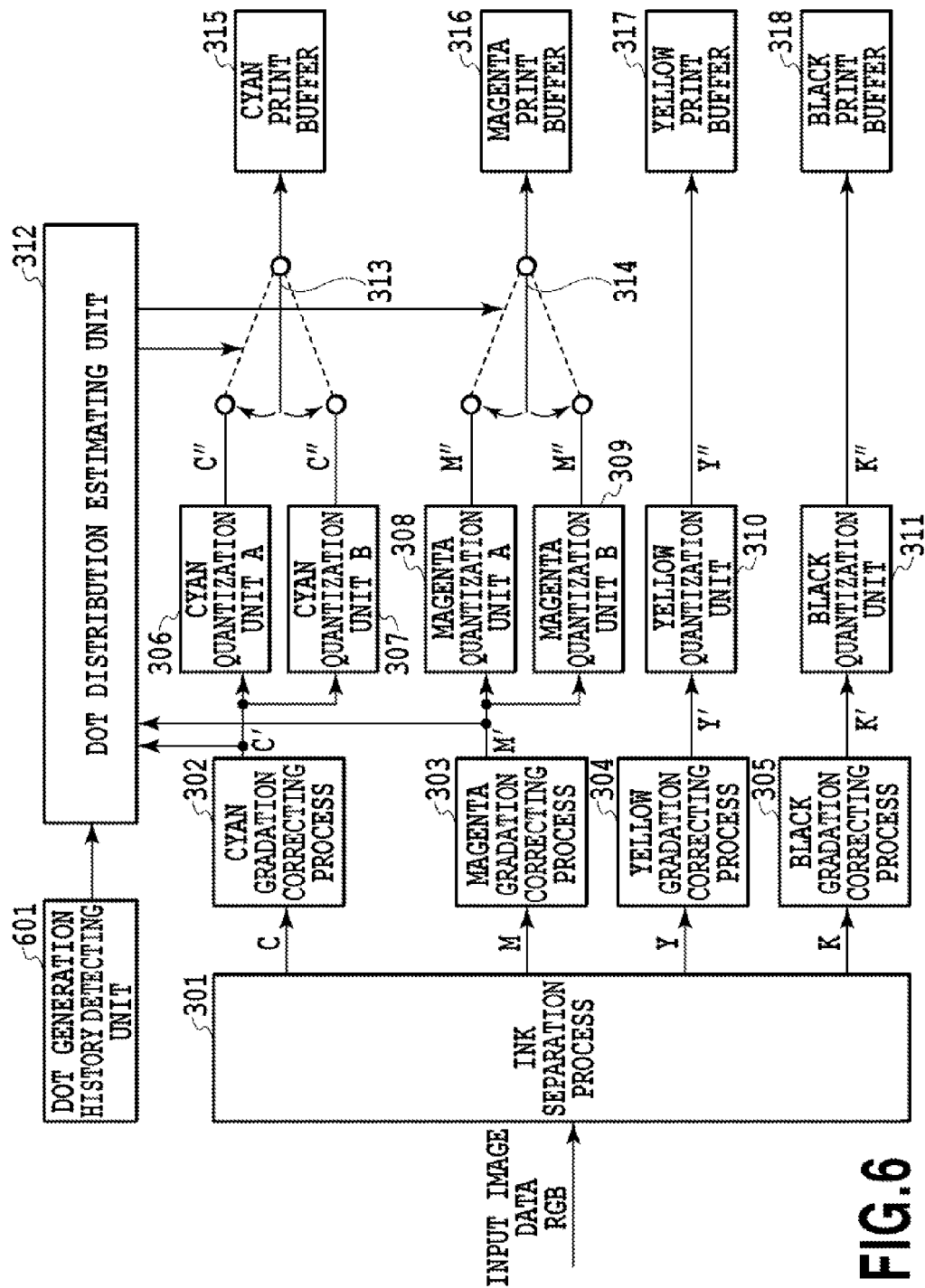
FIG. 6 is a main part block diagram for explaining image processing in a second embodiment.

FIG. 6 is a main part block diagram for explaining image processing performed by an ASIC E1102 in the present embodiment. A point of difference from the first embodiment illustrated in FIG. 3 is that a dot generation history detecting unit 601 is prepared. In the present embodiment, the dot distribution estimating unit 312 selects one of the set of quantization units A and the set of quantization units B on the basis of, in addition to the output value C' from the cyan gradation correcting process 302 and the output value M' from the magenta gradation correcting process 303, an output value from the dot generation history detecting unit 601, as well.

Inkjet printing used in the present embodiment is configured to apply a voltage pulse to a heater equipped for each printing element according to a print signal. Also, the inkjet printing is configured to generate film boiling in ink in contact with the heater, and eject the ink as a droplet by growth energy based on the film boiling. In this case, as the ejection frequency of the print head is increased, temperature of the ink inside the print element increases to reduce viscosity. As a result, even in the case of applying the same voltage pulses, a print head having higher ejection frequency ejects larger ejection volume, and correspondingly the diameter of the printed dot is also larger. That is, the relationship between the number of dots to be printed and graininess changes depending on the ejection frequency of each print head.

In consideration of such a situation, the present embodiment determines a set of quantization units by taking into account a dot generation frequency of each of the cyan print head 102 and the magenta print head 103 in addition to the pieces of multivalued data C' and M'. For this purpose, the dot generation history detecting unit 601 counts the dot generation frequency of each of the print heads 102 and 103 tracing back to the extent of affecting the temperature of the print head at the time of printing, and outputs a count value to the dot distribution estimating unit.

FIGS. 7A and 7B are diagrams illustrating examples of a table referred to by the dot distribution estimating unit 312 to determine the set of quantization units A or the set of quantization units B in the present embodiment. FIG. 7A illustrates a table that is selected in the case where in output values from the dot generation history detecting unit 601, there appears no significant difference in dot generation frequency between the cyan head 102 and the magenta head 103. The table is equivalent to the table in FIG. 5 illustrated in the first embodiment.

On the other hand, FIG. 7B illustrates a table that is selected in the case where a dot generation frequency of the magenta head 103 appears sufficiently larger than that of the cyan head 102 in the output values from the dot generation history detecting unit 601. As compared with FIG. 7A, it turns out that the area 3 focusing on the dispersibility of a single color of magenta is widened. In the case where the magenta dot generation frequency is sufficiently larger than the cyan dot generation frequency, the magenta dot tends to be larger in dot diameter than the cyan dot, and also tends to increase graininess because each dot is easily distinguishable. Accordingly, in this case, to suppress the graininess of the entire image, particularly focusing on the dispersibility of magenta is required. The present embodiment is adapted to, in such a case, select a table as illustrated in FIG. 7B, and for an area where magenta is printed only slightly, select the quantization processes A focusing on single color dispersibility.

Described as an example here is the table that is selected in the case where the dot generation frequency of the magenta head 103 is larger than that of the cyan head 102; however, the dot generation frequency of the cyan head 102 may be larger than that of the magenta head 103. In such a case, it is only necessary to use a table having a tendency opposite to that of FIG. 7B, i.e., a table in which the area 1 is enlarged.

Note that the present embodiment is also not necessarily required to determine a set of the quantization processing units using a table as with the first embodiment. The present invention may be configured to, prepare a function of dot generation frequencies of the cyan and magenta heads 102 and 103 as variables, in addition to the C' and M', and determine a set of quantization units on the basis of calculation result of the function. Also, the present invention may retain only the one table illustrated in FIG. 7, and multiplies C' and M' respectively by weighting coefficients based on the dot generation frequencies to refer to the table in FIG. 7 with results of the multiplication as parameters.

Further, the above is described on the premise that dot graininess increases as the dot generation frequency is increased; however, graininess may also increase in the case where the ejection frequency is lower than the standard. This is caused by, in the case where the ejection frequency is low, promoting the evaporation of moisture in ink to increase the concentration of the color material per dot. Even in such a case, the dot distribution estimating unit 312 of the present embodiment prepares a table focusing on the dispersibility of ink having a small ejection frequency, and thereby an increase in graininess can be suppressed. In any case, in the present embodiment, by experimentally grasping characteristics of inks to be used in advance, an optimum set of quantization units can be selected according to conditions.

Third Embodiment

Figure 8:
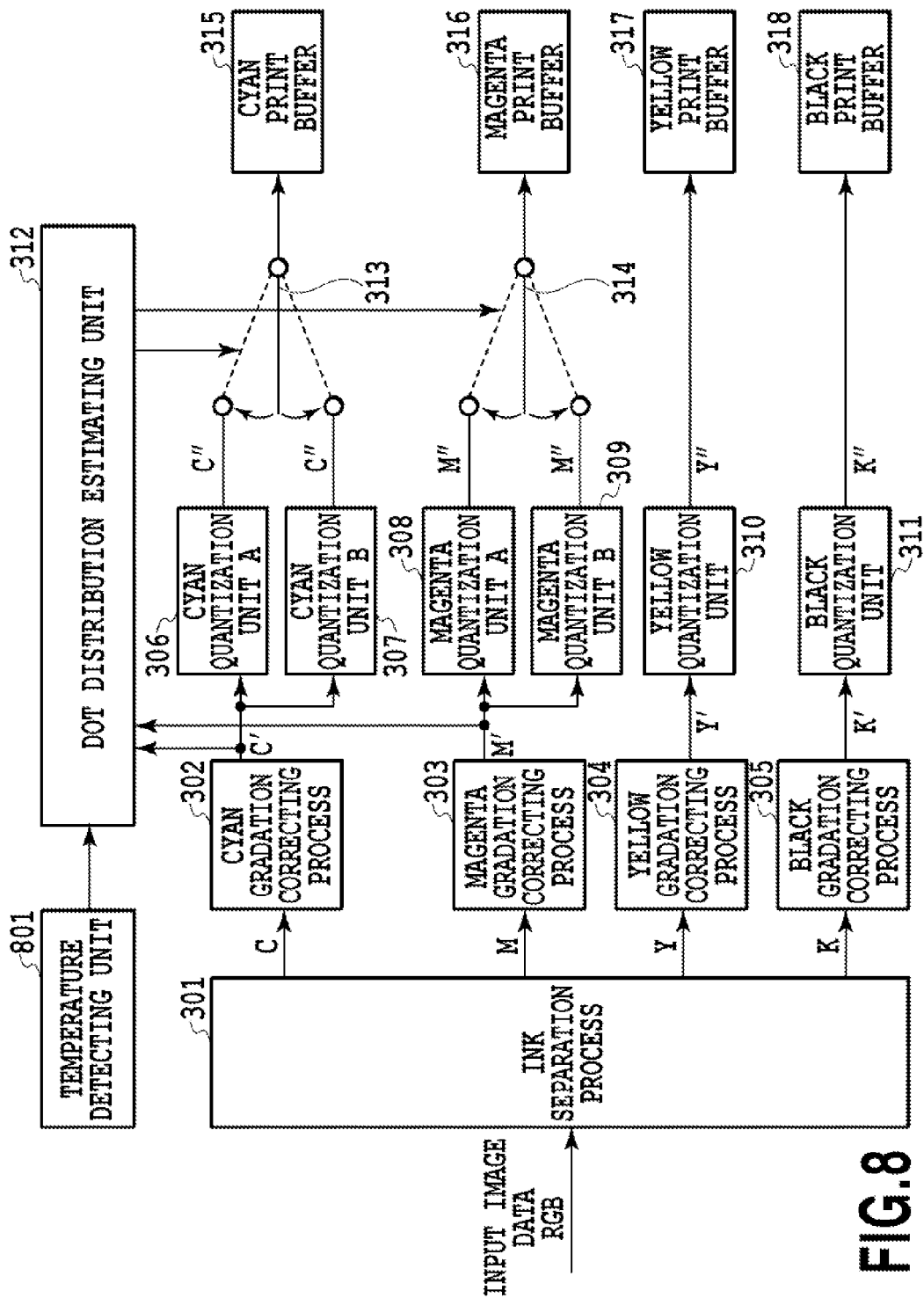
FIG. 8 is a main part block diagram for explaining image processing in a third embodiment.

FIG. 8 is a main part block diagram for explaining image processing performed by an ASIC E1102 in the present embodiment. A point of difference from the second embodiment illustrated in FIG. 6 is that in place of the dot generation history detecting unit 601, a temperature detecting unit 801 is prepared. The temperature detecting unit 801 detects current temperatures of the print heads 102 and 103, and outputs values of the temperatures to the dot distribution estimating unit 312. Then, the dot distribution estimating unit 312 selects any one of the set of quantization units A and the set of quantization units B on the basis of, in addition to the output value C' from the cyan gradation correcting process 302 and the output value M' from the magenta gradation correcting process 303, the temperature detected values from the temperature detecting unit 801, as well.

In the present embodiment, as well, the tables illustrated in FIGS. 7A and 7B can be used. For example, in the case where the detected temperature of the magenta head 103 is sufficiently higher than that of the cyan head 102, the dot distribution estimating unit 312 can use the table illustrated in FIG. 7B rather than in FIG. 7A to determine a set of quantization units.

As described, the present embodiment adapted to directly detect the temperatures of the print heads is effective in the case where a temperature variation not estimable from a dot generation frequency is present. In the present embodiment, the temperature detection may be performed by directly detecting ink temperatures of the respective print heads or measuring atmospheric temperatures near print elements arrayed in the print heads.

Fourth Embodiment

Figure 9:
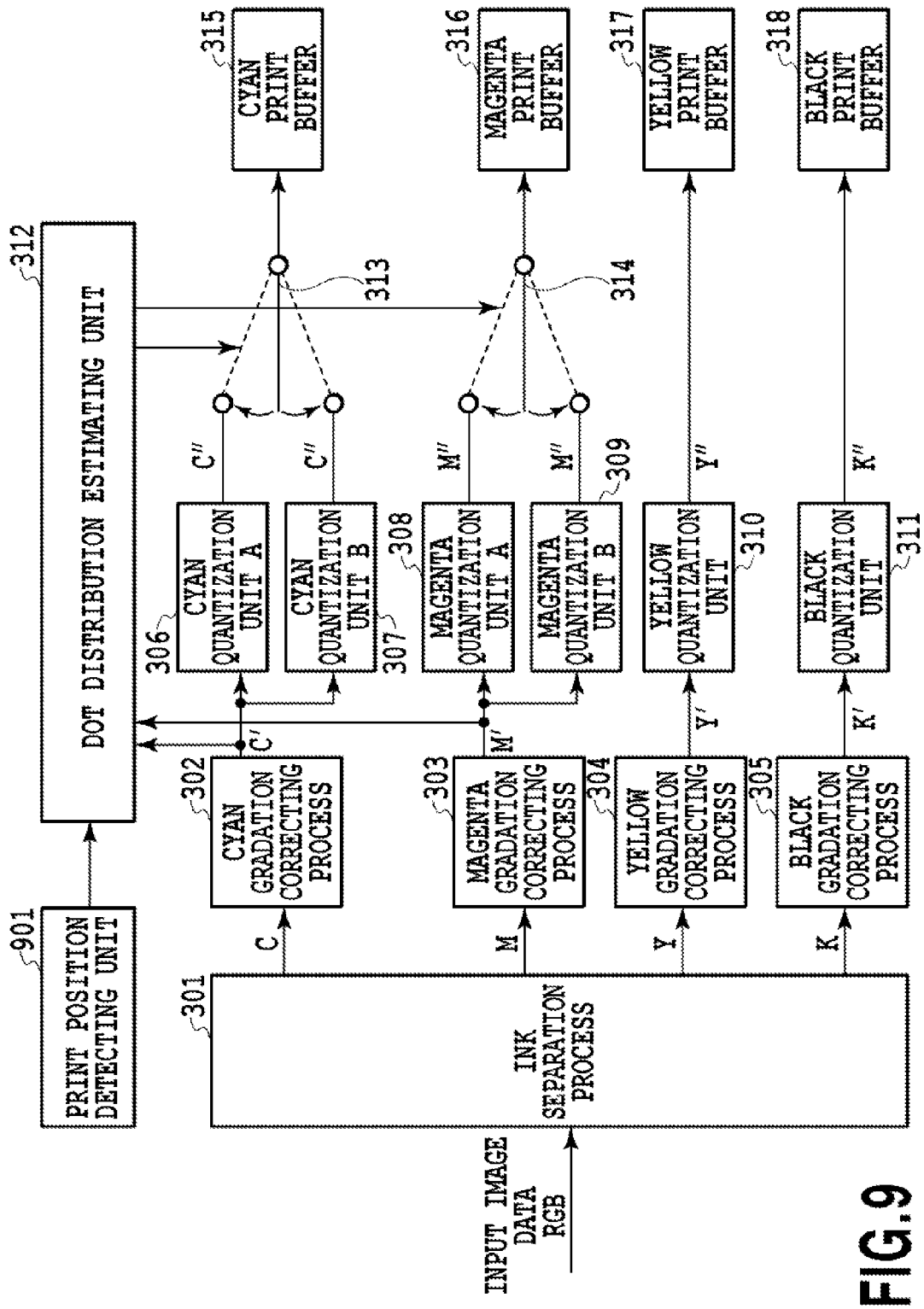
FIG. 9 is a main part block diagram for explaining image processing in a fourth embodiment.

FIG. 9 is a main part block diagram for explaining image processing performed by an ASIC E1102 in the present embodiment. A point of difference from the second embodiment illustrated in FIG. 6 is that in place of the dot generation history detecting unit 601, a print position detecting unit 901 is prepared. The print position detecting unit 901 detects a print position on a sheet of paper, and outputs information on the position to the dot distribution estimating unit 312. Then, the dot distribution estimating unit 312 selects any one of the set of quantization units A and the set of quantization units B on the basis of, in addition to the output value C' from the cyan gradation correcting process 302 and the output value M' from the magenta gradation correcting process 302, the positional information from the print position detecting unit 901 as well.

As described in the second embodiment, as well, in the case where an ejection frequency is low, the inkjet print head prints a high density dot due to the evaporation of moisture in ink. For this reason, in the case of printing on a regular-sized sheet such as an A4-sized sheet or a postcard, during the period from the end of previous page printing to the start of next page printing, a period when the ejection frequency is zero intervenes, and it is often the case that when printing the top of the next page, concentrated ink is consistently ejected. Then, as printing progresses and the ejection operation continues, the concentrated ink is consumed, and the ink is gradually stabilized to normal concentration. In such a case, it can be said that the conspicuousness of graininess varies depending on the position of the print medium.

In consideration of such a situation, the present embodiment determines a set of quantization units by taking into account positional information from the print position detecting unit 901, specifically, a distance L from the top of a sheet of paper, in addition to the pieces of multivalued data C' and M'. For this purpose, for example, the dot distribution estimating unit 312 may be adapted to, in the case where ($|C'-M'|>TH+aL$) is met where TH is a predetermined threshold value and a is a predetermine factor, select the quantization units A, and in the other case, select a set of quantization units in the same manner as that in the first embodiment. In doing so, in the case where an L value is sufficiently small (i.e., in the case of printing the top of the sheet), both the cyan and magenta dots are expected to be conspicuous, and therefore the quantization units B considering the dispersibility for the synthesis of cyan and magenta are selected regardless of the difference between C' and M'.

Fifth Embodiment

Figure 10:
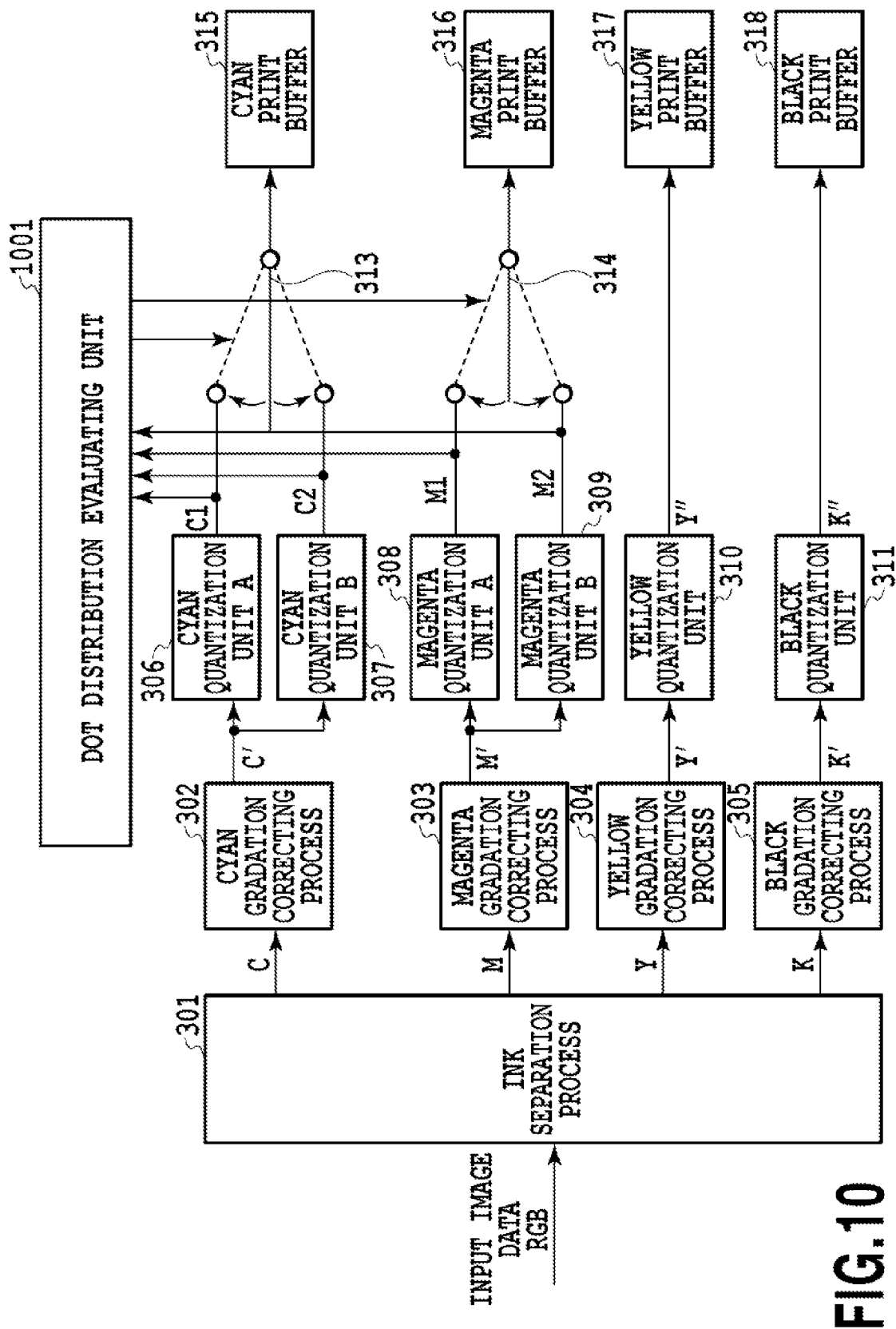
FIG. 10 is a main part block diagram for explaining image processing in a fifth embodiment.

FIG. 10 is a main part block diagram for explaining image processing performed by an ASIC E1102 in the present embodiment. A point of difference from the first embodiment illustrated in FIG. 3 is that a dot distribution evaluating unit 1001 of the present embodiment determines to, on the basis of output results obtained by quantizing C' and M' respectively in the quantization units A, and output results obtained by quantizing C' and M' respectively in the quantization units B, finally selects output values from the quantization units.

A specific description is given below. In FIG. 10, it is assumed that binary data obtained by quantizing the cyan multivalued data output value C' in the cyan quantization unit A is C1, and binary data obtained by quantizing the cyan multivalued data output value C' in the cyan quantization unit B is C2. It is also assumed that binary data obtained by quantizing the magenta multivalued data output value M' in the magenta quantization unit A is M1, and binary data obtained by quantizing the magenta multivalued data output value M' in the magenta quantization unit B is M2. The dot distribution evaluating unit 1001 obtains the following four combinations of CM dot arrangement patterns from the four parameters C1, C2, M1, and M2.

Mutually superimposing the cyan quantization result C1 by the quantization unit A and the magenta quantization result M1 by the quantization unit A obtains a CM dot arrangement pattern 1.

Mutually superimposing the cyan quantization result C1 by the quantization unit A and the magenta quantization result M2 by the quantization unit B obtains a CM dot arrangement pattern 2.

Mutually superimposing the cyan quantization result C2 by the quantization unit B and the magenta quantization result M1 by the quantization unit A obtains a CM dot arrangement pattern 3.

Mutually superimposing the cyan quantization result C2 by the quantization unit B and the magenta quantization result M2 by the quantization unit B obtains a CM dot arrangement pattern 4.

The dot distribution evaluating unit 1001 selects a combination having the smallest number of superimposed dots from the four CM dot arrangement patterns 1 to 4, and sets the quantization unit A or the quantization unit B for cyan and the quantization unit A or the quantization unit B for magenta so as to achieve the combination. In this case, even though the quantization unit A is set for cyan, the quantization unit B may be set for magenta, as well. As already described, the presence of superimposed dots is a major factor increasing graininess. This embodiment selects a combination to eliminate the presence of such superimposed dots, and thereby actively reduces graininess in a mixed color area of cyan and magenta.

The present embodiment can also select quantization units in consideration of, not only the number of superimposed dots, but a difference in conspicuousness among single dots of cyan, magenta, and blue. This is specifically described below. It is first assumed that a quantized value of a cyan single dot is C, a quantized value of a magenta single dot is M, and a quantized value of a blue dot is B. It is also assumed that a weighting coefficient representing the conspicuousness of the cyan single dot is $\alpha$, a weighting coefficient of the magenta single dot is $\beta$, and a weighting coefficient of the blow dot is $\gamma$. In this case, the total power P of a target pixel can be calculated from $P=\alpha C+\beta M+\gamma B$. The dot distribution evaluating unit 1001 selects a combination of quantization units minimizing the total power P, and sets the quantization unit A or the quantization unit B for cyan and quantization unit A or the quantization unit B for magenta so as to achieve the combination. Such a configuration can effectively reduce graininess in an image where cyan dots and magenta dots are mixed, even in the case where the conspicuousness of cyan and the conspicuousness of magenta are different from each other.

Note that in the present embodiment, dither patterns prepared in the quantization units A and the quantization units B are not necessarily required to be the dither patterns focusing on the single color dispersibility and the dither patterns focusing on the mixed color dispersibility as described in the first embodiment. For example, by preparing multiple dither patterns respectively having somehow different characteristics, such as a dither pattern having directivity in the horizontal direction and a dither pattern having directivity in the vertical direction, the effect of the present embodiment can be sufficiently obtained.

Sixth Embodiment

Figure 11:
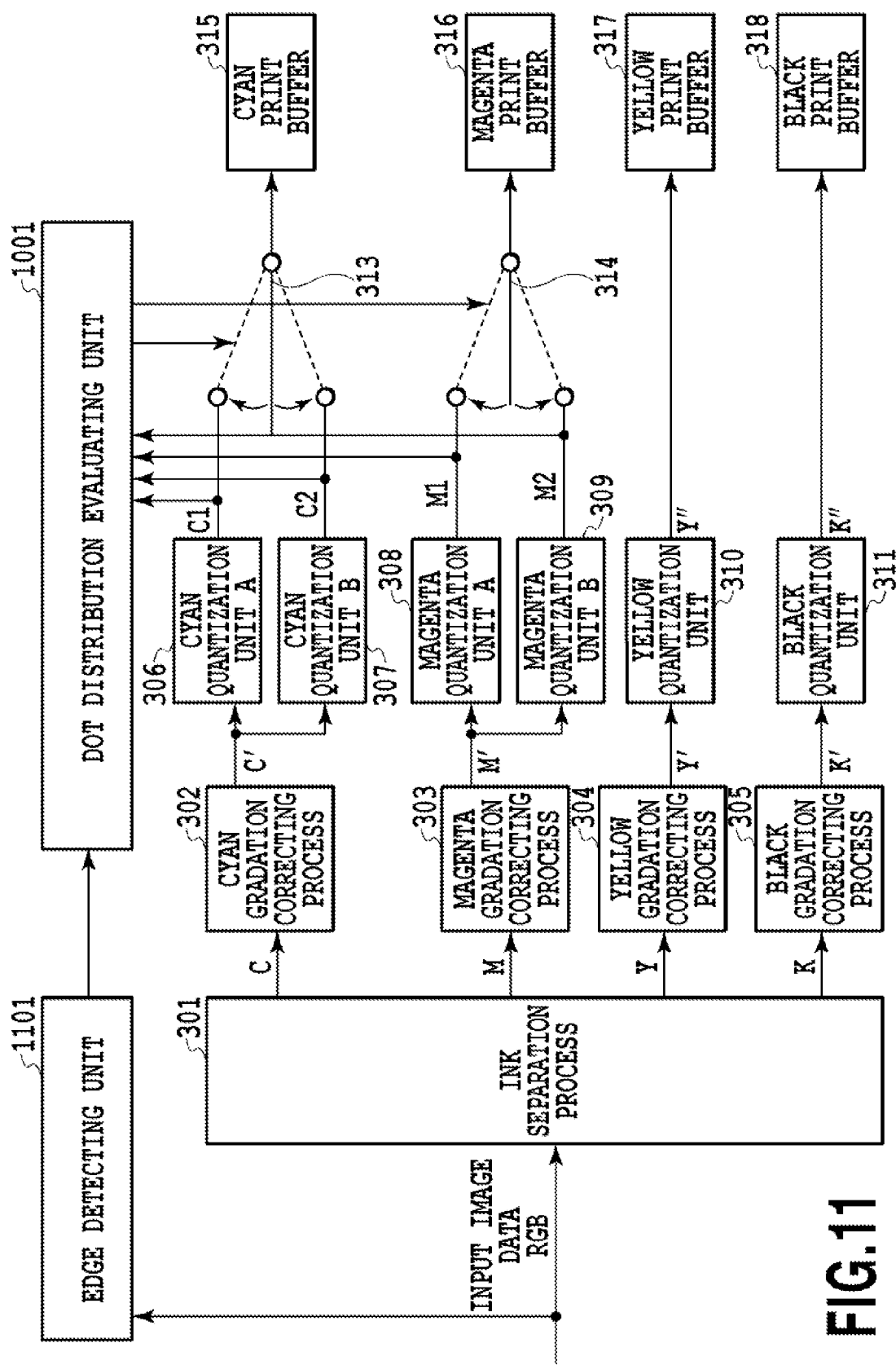
FIG. 11 is a main part block diagram for explaining image processing in a sixth embodiment.

FIG. 11 is a main part block diagram for explaining image processing performed by an ASIC E1102 in the present embodiment. A point of difference from the fifth embodiment illustrated in FIG. 10 is that an edge detecting unit 1101 is prepared. The dot distribution evaluating unit 1001 of the present embodiment selects one of the quantization units A and B for cyan and one of the quantization units A and B for magenta on the basis of, in addition to the four parameters C1, C2, M1, and M2 described in the fifth embodiment, an output value from the edge detecting unit 1101 as well.

In the fifth embodiment, in order to reduce graininess within an image, quantization units minimizing the formation of superimposed dots as much as possible are set. However, for example, in the case of a blue line drawing or the like, magenta data and cyan data coincide in position with each other in an original image, and mutually superimposing magenta dots and cyan dots results in a preferable image having high sharpness as an output result. That is, at the edge part of an image, a reduction in graininess is not required. In the present embodiment, in consideration of such a situation, the edge detecting units 1101 detects whether or not a target pixel is positioned at the edge part. An edge detection process itself can be performed by obtaining the difference between a gradation value of the target pixel and that of a peripheral pixel. Further, in the case where the target pixel is at the edge part, the dot distribution evaluating unit 1001 does not count superimposed dots in the CM dot arrangement patterns 1 to 4. On the other hand, only in the case where the target pixel is not at the edge part, i.e., the target pixel is in an even area, as in the fifth embodiment, superimposed dots in the CM dot arrangement patterns 1 to 4 are counted. Then, quantization units achieving a combination minimizing the number of superimposed dots are set for cyan and magenta, respectively. For example, consider that in the configuration where quantization units are switched on a 256-pixel×256-pixel basis, 2000 pixels determined to be at an edge part are present. In this case, it is only necessary that the dot distribution evaluating unit 1001 counts superimposed dots in only (256×256−2000=63536) pixels of (256×256) pixels to determine quantization units.

The first to sixth embodiments are described above, and these embodiments can also be mutually combined. For example, the dot generation history detecting unit 601 in the second embodiment illustrated in FIG. 6, the temperature detecting unit in the third embodiment illustrated in FIG. 8, and the print position detecting unit 901 in the fourth embodiment illustrated in FIG. 9 can also be simultaneously utilized. Also, these three detecting units can be incorporated in the fifth or sixth embodiment, and on the basis of, in addition to the four parameters C1, C2, M1, and M2, detected results from the three detecting units, as well, a quantization unit for each of cyan and magenta can be selected.

Also, the above description is given with the configuration where only for each of the cyan ink (first ink) and magenta ink (second ink) as colors particularly affecting graininess, the different quantization units are prepared; however, the present invention is not limited to such a configuration. Cyan and magenta can be replaced by a combination of two different colors, or on the basis of a relationship in concentration among three or four colors, i.e., cyan, magenta, and additionally black or/and yellow, quantization processes considering dispersibility can also be performed. In the case of three colors, the table illustrated in FIG. 5 changes into a three-dimensional table, and in the case of four colors, the table changes into a four-dimensional table. Needless to say, the present invention is effective even in the case of employing inks having high lightness, such as light cyan and light magenta inks, and inks other than the above-described four color inks, such as particular color inks like red and blue inks. In the case of the fifth or sixth embodiment, it is necessary to select a combination of quantization units minimizing the total power P of a target pixel in consideration of, in addition to a dot printed in the secondary color, a dot printed in a ternary or higher-order color as well, and set a quantization unit for each color.

Further, in the above-described embodiments, the full-line type printing apparatus is taken as an example to give the description using FIG. 1; however, it should be appreciated that the present invention is not limited to such a configuration. The present invention is effective even for a serial type printing apparatus that alternately performs a print scan, which ejects ink while moving a carriage mounted with a plurality of print heads with respect to a print medium, and a conveyance operation, which conveys the print medium in a direction intersecting with the print scan.

Further, in the above embodiments, the description is given with the configuration where the distinctive image processing of the present invention is performed in the printer engine illustrated in FIG. 2; however, the distinctive image processing of the present invention may be performed not in the printing apparatus, but in a host device connected to the printing apparatus. In such a case, binary data obtained as a result of quantization performed in the host device is transferred to the printing apparatus, and the host device serves as the image processing apparatus of the present invention. In this case, a system in which a series of processes as described above is performed is also within the scope of the present invention even in the case where the processes are performed by hardware or software.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more hard disks, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-206319, filed Oct. 1, 2013, which is hereby incorporated by reference herein in its entirety.

What is claimed is:

1. An image processing apparatus that, in order to print an image on a print medium according to binary data defining printing or non-printing of a dot, processes pieces of multivalued data corresponding to multiple inks using dither patterns representing threshold values for comparing with values of the multivalued data, the image processing apparatus comprising:
a first quantization unit configured to use a first dither pattern to quantize multivalued data for a first ink in such a way as to reduce the number of levels of the multivalued data for the first ink;
a second quantization unit configured to use a second dither pattern that is different from the first dither pattern to quantize the multivalued data for the first ink in such a way as to reduce the number of levels of the multivalued data for the first ink;
a third quantization unit configured to use a third dither pattern to quantize multivalued data for a second ink that has different color from the first ink in such a way as to reduce the number of levels of the multivalued data for the second ink;
a fourth quantization unit configured to use a fourth dither pattern that is different from the third dither pattern to quantize the multivalued data for the second ink in such a way as to reduce the number of levels of the multivalued data for the second ink; and
a selection unit configured to, on the basis of a combination of the multivalued data for the first ink and the multivalued data for the second ink, select one of a quantization result from the first quantization unit and a quantization result from the second quantization unit to be used for printing of the first ink, and select one of a quantization result from the third quantization unit and a quantization result from the fourth quantization unit to be used for printing of the second ink,
wherein:
a dispersibility of an arrangement of dots, that are printed by a printing unit with the first ink based on the quantization result of quantizing a multivalued data having a predetermined gradation level by using the first dither pattern, is higher than a dispersibility of an arrangement of dots, that are printed by the printing unit with the first ink based on the quantization result of quantizing the multivalued data having the predetermined gradation level by using the second dither pattern; and
a dispersibility of an arrangement of dots, that are printed by a printing unit with the second ink based on the quantization result of quantizing a multivalued data having a predetermined gradation level by using the third dither pattern, is higher than a dispersibility of an arrangement of dots, that are printed by the printing unit with the second ink based on the quantization result of quantizing the multivalued data having the predetermined gradation level by using the fourth dither pattern.

2. The image processing apparatus according to claim 1, further comprising a history information obtaining unit configured to obtain information regarding a history of a print count of dots of the first ink by the printing unit and a print count of dots of the second ink by the printing unit,
wherein on a basis of the information indicated by the history information obtaining unit, and the combination of the multivalued data for the first ink and the multivalued data for the second ink, the selection unit selects one of the quantization result from the first quantization unit and the quantization result from the second quantization unit for the first ink, and selects one of the quantization result from the third quantization unit and the quantization result from the fourth quantization unit for the multivalued data for the second ink.

3. The image processing apparatus according to claim 1, further comprising a temperature information obtaining unit configured to obtain an information regarding the temperature of a first print head printing dots of the first ink and the temperature of a second print head printing dots of the second ink,
wherein on a basis of temperatures of the first print head and the second print head that are indicated by the temperature information obtaining unit, and the combination of the multivalued data for the first ink and the multivalued data for the second ink, the selection unit selects one of the quantization result from the first quantization unit and the quantization result from the second quantization unit for the first ink, and selects one of the quantization result from the third quantization unit and the quantization result from the fourth quantization unit for the second ink.

4. The image processing apparatus according to claim 1, further comprising a print position detecting unit configured to detect a printing position on a print medium,
wherein on a basis of the result of the detection by the print position detecting unit, and the combination of the multivalued data for the first ink and the multivalued data for the second ink, the selection unit selects one of the quantization result from the first quantization unit and the quantization result from the second quantization unit for the first ink, and selects one of the quantization result from the third quantization unit and the quantization result from the fourth quantization unit for the second ink.

5. The image processing apparatus according to claim 1, wherein the first quantization unit, the second quantization unit, the third quantization unit and the fourth quantization unit quantize multivalued data into binary data respectively.

6. The image processing apparatus according to claim 1, wherein the first quantization unit, the second quantization unit, the third quantization unit and the fourth quantization unit output multivalued data having lower gradation levels than that of inputted multivalued data.

7. The image processing apparatus according to claim 1, further comprising a printing unit configured to print on the print medium based on the data obtained by the quantization process performed by one of the quantization units that is selected by the selection unit.

8. The image processing apparatus according to claim 1, wherein,
in a case where a value of the multivalued data for the first ink is larger than a value of the multivalued data for the second ink by a value that is larger than or equal to a first value, the selection unit selects the quantization result from the first quantization unit for printing of the first ink, and
in a case where a value of the multivalued data for the second ink is larger than a value of the multivalued data for the first ink by a value that is larger than or equal to a second value, the selection unit selects the quantization result from the third quantization unit for printing of the second ink.

9. The image processing apparatus according to claim 8, wherein, in a case where a difference between a value of the multivalued data for the first ink and a value of the multivalued data for the second ink is smaller than a sum of the first value and the second value, the selection unit selects the quantization result from the second quantization unit for printing of the first ink, and selects the quantization result from the fourth quantization unit for printing of the second ink.

10. The image processing apparatus according to claim 1, wherein the first ink and the second ink are cyan ink and magenta ink, respectively.

11. The image processing apparatus according to claim 1, wherein,
in a case where a variation between a value of the multivalued data for the first ink and a value of the multivalued data for the second ink is relatively large, the selection unit selects the quantization result from the first quantization unit for printing of the first ink, and selects the quantization result from the third quantization unit for printing of the second ink and,
in a case where a variation between a value of the multivalued data for the first ink and a value of the multivalued data for the second ink is relatively small, the selection unit selects the quantization result from the second quantization unit for printing of the first ink, and selects the quantization result from the fourth quantization unit for printing of the second ink.

12. An image processing apparatus that, in order to print a pseudo halftone image according to binary data defining printing or non-printing of a dot, converts pieces of multivalued gradation data corresponding to multiple inks to pieces of binary data corresponding to the respective inks, the image processing apparatus comprising:
a first quantization unit configured to use a first dither pattern to quantize multivalued data for a first ink in such a way as to reduce the number of levels of the multivalued data of the first ink;
a second quantization unit configured to use a second dither pattern to quantize the multivalued data for the first ink in such a way as to reduce the number of levels of the multivalued data for the first ink;
a third quantization unit configured to use a third dither pattern to quantize multivalued data for a second ink in such a way as to reduce the number of levels of the multivalued data for the second ink;
a fourth quantization unit configured to use a fourth dither pattern to quantize the multivalued data for the second ink in such a way as to reduce the number of levels of the multivalued data for the second ink; and
a selection unit configured to, on the basis of an output result of data quantized by the first quantization unit, an output result of data quantized by the second quantization unit, an output result of data quantized by the third quantization unit, and an output result of data quantized by the fourth quantization unit, select one of the first quantization unit and the second quantization unit for the first ink, and select one of the third quantization unit and the fourth quantization unit for the second ink,
wherein:
a dispersibility of an arrangement of dots, that are printed by a printing unit with the first ink based on the quantization result of quantizing a multivalued data having a predetermined gradation level by using the first dither pattern, is higher than a dispersibility of an arrangement of dots, that are printed by the printing unit with the first ink based on the quantization result of quantizing the multivalued data having the predetermined gradation level by using the second dither pattern; and
a dispersibility of an arrangement of dots, that are printed by a printing unit with the second ink based on the quantization result of quantizing a multivalued data having a predetermined gradation level by using the third dither pattern, is higher than a dispersibility of an arrangement of dots, that are printed by the printing unit with the second ink based on the quantization result of quantizing the multivalued data having the predetermined gradation level by using the fourth dither pattern.

13. The image processing apparatus according to claim 12, wherein:
the selection unit selects one of the first quantization unit and the second quantization unit for the first ink and selects one of the third quantization unit and the fourth quantization unit for the second ink so as to increase dispersibility of a synthesis of arrangement of dots printed with the first ink and arrangement of dots printed with the second ink.

14. The image processing apparatus according to claim 12, further comprising an edge detecting unit configured to detect whether or not a target pixel is positioned at an edge part,
wherein on a basis of the result of the detection by the edge detecting unit, the binary data from the first quantization unit, the binary data from the second quantization unit, the binary data from the third quantization unit, and the binary data from the fourth quantization unit, the selection unit selects one of the first quantization unit and the second quantization unit for the first ink, and selects one of the third quantization unit and the fourth quantization unit for the second ink.

15. The image processing apparatus according to claim 12, wherein the first dither pattern and the second dither pattern are dither patterns respectively having mutually different directivities, and the third dither pattern and the fourth dither pattern are dither patterns respectively having mutually different directivities.

16. An image processing method that, in order to print an image on a print medium according to binary data defining printing or non-printing of a dot, processes pieces of multivalued data corresponding to multiple inks using dither patterns representing threshold values for comparing with values of the multivalued data, the image processing method comprising:
- a first quantization step of using a first dither pattern to quantize multivalued data for a first ink in such a way as to reduce the number of levels of the multivalued data for the first ink;
- a second quantization step of using a second dither pattern that is different from the first dither pattern to quantize the multivalued data for the first ink in such a way as to reduce the number of levels of the multivalued data for the first ink;
- a third quantization step of using a third dither pattern to quantize multivalued data for a second ink that has different color from the first ink in such a way as to reduce the number of levels of the multivalued data for the second ink;
- a fourth quantization step of using a fourth dither pattern that is different from the third dither pattern to quantize the multivalued data for the second ink in such a way as to reduce the number of levels of the multivalued data for the second ink; and
- a selection step of, on the basis of a combination of the multivalued data for the first ink and the multivalued data for the second ink, selecting one of a quantization result from the first quantization step and a quantization result from the second quantization step for printing of the first ink, and selecting one of a quantization result from the third quantization step and a quantization result from the fourth quantization step for printing of the second ink, wherein:
- a dispersibility of an arrangement of dots, that are printed by a printing unit with the first ink based on the quantization result of quantizing a multivalued data having a predetermined gradation level by using the first dither pattern, is higher than a dispersibility of an arrangement of dots, that are printed by the printing unit with the first ink based on the quantization result of quantizing the multivalued data having the predetermined gradation level by using the second dither pattern; and
- a dispersibility of an arrangement of dots, that are printed by a printing unit with the second ink based on the quantization result of quantizing a multivalued data having a predetermined gradation level by using the third dither pattern, is higher than a dispersibility of an arrangement of dots, that are printed by the printing unit with the second ink based on the quantization result of quantizing the multivalued data having the predetermined gradation level by using the fourth dither pattern.

17. The image processing method according to claim 16, wherein the first quantization step, the second quantization step, the third quantization step and the fourth quantization step quantize multivalued data into binary data respectively.

18. The image processing method according to claim 16, wherein the first quantization step, the second quantization step, the third quantization step and the fourth quantization step output multivalued data having lower gradation levels than that of inputted multivalued data.

19. The image processing method according to claim 16, wherein, in a case where a value of the multivalued data for the first ink is larger than a value of the multivalued data for the second ink by a value that is larger than or equal to a first value, the selection step selects the quantization result from the first quantization step for printing of the first ink, and
in a case where a value of the multivalued data for the second ink is larger than a value of the multivalued data for the first ink by a value that is larger than or equal to a second value, the selection step selects the quantization result from the third quantization step for printing of the second ink.

20. The image processing method according to claim 19, wherein, in a case where a difference between a value of the multivalued data for the first ink and a value of the multivalued data for the second ink is smaller than a sum of the first value and the second value, the selection step selects the quantization result from the second quantization step for printing of the first ink, and selects the quantization result from the fourth quantization step for printing of the second ink.

21. The image processing method according to claim 16, wherein,
- in a case where a variation between a value of the multivalued data for the first ink and a value of the multivalued data for the second ink is relatively large, the selection step selects the quantization result from the first quantization unit for printing of the first ink, and selects the quantization result from the third quantization unit for printing of the second ink and,
- in a case where a variation between a value of the multivalued data for the first ink and a value of the multivalued data for the second ink is relatively small, the selection step selects the quantization result from the second quantization unit for printing of the first ink, and selects the quantization result from the fourth quantization unit for printing of the second ink.

22. An image processing apparatus that, in order to print an image on a print medium according to binary data defining printing or non-printing of a dot, uses dither patterns representing arrangement of a plurality of threshold values for comparing with multivalued data to process pieces of the multivalued data corresponding to multiple inks, the image processing apparatus comprising:
- a first plurality of quantization units configured to quantize the multivalued data for a first ink in such a way as to reduce the number of levels of the multivalued data of the first ink, wherein arrangements of the threshold values used by the first plurality of quantization units respectively are different from each other;
- a second plurality of quantization units configured to quantize the multivalued data for a second ink in such a way as to reduce the number of levels of the multivalued data of the second ink, wherein arrangements of the threshold values used by the second plurality of quantization units respectively are different from each other; and
- a determination unit configured to, on the basis of a combination of the multivalued data for the first ink and the multivalued data for the second ink, determine which quantization unit is to be used for printing of the first ink from the first plurality of quantization units for the multivalued data for the first ink, and determine which quantization unit is to be used for printing of the second ink from the second plurality of quantization units for the multivalued data for the second ink, wherein:
- a dispersibility of an arrangement of dots, that are printed by a printing unit with the first ink based on the quantization result of quantizing multivalued data having a predetermined gradation level by using a first dither pattern, is higher than a dispersibility of an arrangement of dots, that are printed by the printing unit with the first ink based on the quantization result of quantizing the multivalued data having the predetermined gradation level by using a second dither pattern; and a dispersibility of an arrangement of dots, that are printed by a printing unit with the second ink based on the quantization result of quantizing a multivalued data having a predetermined gradation level by using a third dither pattern, is higher than a dispersibility of an arrangement of dots, that are printed by the printing unit with the second ink based on the quantization result of quantizing the multivalued data having the predetermined gradation level by using a fourth dither pattern.

23. An image processing method that, in order to print a pseudo halftone image according to binary data defining printing or non-printing of a dot, converts pieces of multivalued data corresponding to multiple inks to pieces of binary data corresponding to the respective inks, the image processing method comprising:

a first quantization step of using a first dither pattern to quantize multivalued data for a first ink to binary data;

a second quantization step of using a second dither pattern to quantize the multivalued data for the first ink to binary data;

a third quantization step of using a third dither pattern to quantize multivalued data for a second ink to binary data;

a fourth quantization step of using a fourth dither pattern to quantize the multivalued data for the second ink to binary data; and a selection step of, on the basis of the binary data by the first quantization step, the binary data by the second quantization step, the binary data by the third quantization step, and the binary data by the fourth quantization step, selecting one of the first quantization step and the second quantization step for the first ink, and selecting one of the third quantization step and the fourth quantization step for the second ink, wherein:

a dispersibility of an arrangement of dots, that are printed by a printing unit with the first ink based on the quantization result of quantizing a multivalued data having a predetermined gradation level by using the first dither pattern, is higher than a dispersibility of an arrangement of dots, that are printed by the printing unit with the first ink based on the quantization result of quantizing the multivalued data having the predetermined gradation level by using the second dither pattern; and a dispersibility of an arrangement of dots, that are printed by a printing unit with the second ink based on the quantization result of quantizing a multivalued data having a predetermined gradation level by using the third dither pattern, is higher than a dispersibility of an arrangement of dots, that are printed by the printing unit with the second ink based on the quantization result of quantizing the multivalued data having the predetermined gradation level by using the fourth dither pattern.

24. A non-transitory computer readable storage medium storing a program for causing a computer to perform the image processing apparatus method according to claim 16.

* * * * *